United States Patent Office 3,003,772
Patented Oct. 10, 1961

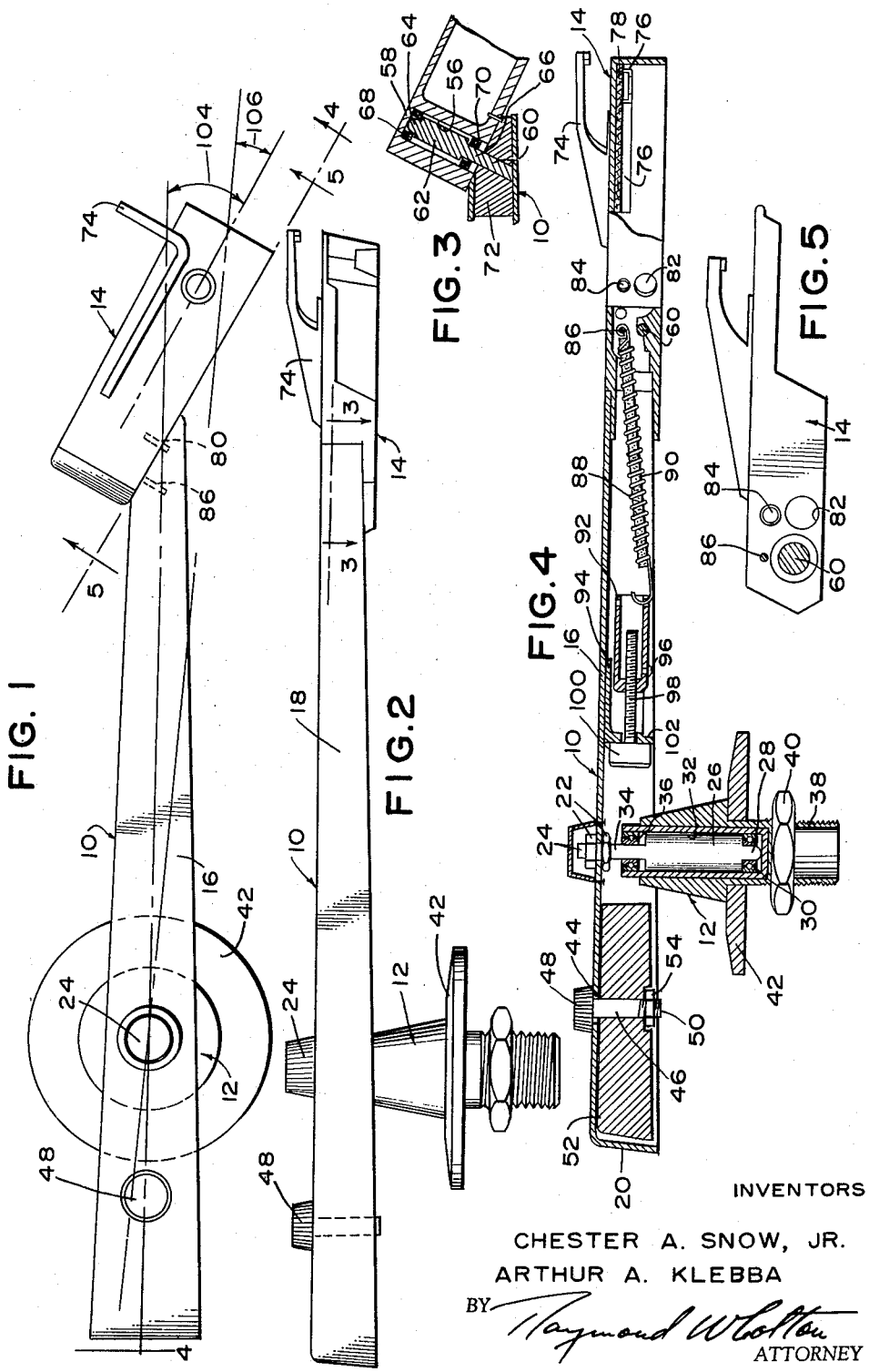

3,003,772
TRANSDUCER ASSEMBLY
Chester A. Snow, Jr., Middletown, and Arthur A. Klebba, Enfield, Conn., assignors to The Gray Manufacturing Company, a corporation of Connecticut
Filed Sept. 19, 1957, Ser. No. 685,017
19 Claims. (Cl. 274—23)

This invention relates to a transducer assembly and particularly to a reproducer arm assembly partaking of all of the advantages of viscous damped assemblies previously known in the art while avoiding their principal disadvantages.

Viscous damped reproducer arms of the type disclosed by the patent to Bachman, 2,676,806, dated April 27, 1954 have always resulted in varying shear velocities whether the opposed surfaces receiving the viscous fluid were hemispherical or elongated. Moreover, where ball and socket joints have been used, there is necessarily a compromise between the requirements for movement about a horizontal axis and movement about a vertical axis. Arm assemblies of these known types are also susceptible to the loss of fluid between the surfaces requiring it since they are lacking in suitable means for retention of the fluid. Furthermore, no reproducer arm assembly of this general category is known to have complete balance about the vertical axis of rotation, a condition which has been found to be highly advantageous in achieving improved reproduction.

It is among the objects of the present invention to overcome these disadvantages by providing a transducer assembly comprising a support, an arm and a head, a first pivot joint connecting the support and arm for relative movement about a vertical axis, a second pivot joint connecting the arm and head for relative movement about a horizontal axis, the second pivot joint including members providing concentric surfaces of revolution spaced to define an annular gap, and a damping liquid occupying the gap. It is also preferred that the first pivot joint provide concentric surfaces of revolution spaced to define an annular gap with a damping liquid occupying that gap as well. The surfaces of revolution in each case are preferably cylindrical and the first pivot joint preferably has an axis of rotation intersecting the center of gravity of the assembly. The second pivot joint preferably has an axis of rotation disposed at an angle exceeding 90° to a longitudinal axis of the arm.

The transducer assembly may be characterized as comprising a support, an arm and a head, a first pivot joint connecting the support and arm for relative movement about a vertical axis, a second pivot joint connecting the arm and head for relative movement about a horizontal axis, each of the pivot joints comprising members providing spaced concentric surfaces of revolution having viscous damping liquid interposed therebetween. In accordance with one form of the invention, the first and second pivot joints are dissimilarly damped. One or both of the pivot joints may be equipped with antifriction bearings and one of the pivot joints, or both, preferably comprises a socket member closed at one end providing one of the surfaces and a pintle member providing another of the surfaces. In such cases, the socket member preferably houses a bearing and the pintle member has a reduced end received therein. Where the socket member houses spaced bearings, the pintle member may have reduced portions received in each of them.

It is also among the objects of the invention to provide a transducer assembly comprising a support, an arm and a head, a first pivot joint connecting the support to an intermediate portion of the arm for relative movement about a vertical axis, a second pivot joint connecting the head near one end of the arm for relative movement about a horizontal axis, and a spring carried by the arm biasing the head about the horizontal axis. The spring is preferably damped and is provided with adjusting means for varying its force. In a preferred form of the invention, the spring is helical and is provided with a damping member extending through and in engagement with its convolutions.

A more complete understanding of the invention will follow a description of the accompanying drawings wherein:

FIG. 1 is a plan view of a transducer assembly in accordance with the present invention;
FIG. 2 is an elevation of the assembly shown in FIG. 1;
FIG. 3 is a fragmentary section on a somewhat enlarged scale taken along line 3—3 of FIG. 2;
FIG. 4 is an elevation partially in section taken along line 4—4 of FIG. 1; and
FIG. 5 is a side elevation of the head taken along line 5—5 of FIG. 1.

An arm 10 is mounted for pivotal movement about a vertical axis with respect to a support 12 and at its remote end carries a head 14 pivoted thereto for relative movement about a horizontal axis.

The arm 10 is tapered in plan having an upper surface 16, side flanges 18, an end flange 20, and open at the bottom, thus assuming a channel-like configuration.

At an intermediate portion of its length, the arm 10 is clamped between opposed nuts 22 carried by the upper threaded end of a pintle 24 having an enlarged central cylindrical portion 26 and a reduced lower end 28. The lower reduced portion 28 is received by an antifriction bearing 30 seated in a cylindrical well 32 formed in the support 12. The upper reduced portion 34 of the pintle is received by an antifriction bearing 36 also carried by the support. The lower end of the well 32 is closed to retain a body of damping liquid such as a silicone oil or other viscous material having predetermined characteristics. The spacing between the enlarged cylindrical portion 26 of the pintle and the cylindrical well 32 is selected with respect to the liquid to be used so as to provide the proper order of damping. Moreover, the gap between these cylindrical portions will be sufficiently small to provide capillary attraction for retention of the liquid between these surfaces. The lower end of the support is provided with screw threads 38 for the application of a nut 40 between which and a washer 42, the base plate of a turntable can be clamped.

Precisely locating the axis of the vertical pivot defined between the arm 10 and support 12 so as to intersect the center of gravity of the assembly as an entirety, combined with the damping effect, produces the ultimate in tracking reliability and resistance to groove-hopping which would otherwise result from jarring or vibration transmitted to the arm through the vertical pivot. By virtue of this balanced condition about the vertical axis, no resultant force is produced by a lack of level support of the assembly and accordingly, no undesirable lateral motions of the arm will be experienced from this condition.

Towards the end of the arm 10 remote from the head 14, its upper surface 16 is provided with a slot 44 for the reception of the shank 46 of a screw having a head 48 and a lower threaded end 50. A counterweight 52 is suspended from this screw in cooperation with a nut 54. By adjustment of the position of the counterweight 52, the required balance is achieved, whereupon the screw is tightened with respect to the nut to clamp the counterweight in its proper position relative to the length of the arm.

The head 14 is provided with a bore 56 closed at one end 58 remote from the arm to receive a horizontal pintle 60 having an enlarged central cylindrical portion 62 and reduced ends 64 and 66. The reduced end 64 received adjacent the closed end 58 of the bore is embraced by an antifriction bearing 68 while the opposite reduced end 66 of the pintle is embraced by an antifriction bearing 70. The enlarged central cylindrical portion 62 of the pintle is spaced only slightly from the cylindrical bore 56 to provide a capillary gap for the reception of a damping liquid such as a silicone oil or other viscous material. The end of the pintle 60 remote from the reduced end 64 is received by a block 72 securing it in a suitable manner to the end of the arm 10. In this manner, the head 14 will be pivotally movable about a horizontal axis with respect to the arm 10 and restrained against any other appreciable movement relative thereto. Similarly, the movement of the arm about the vertical axis provided by the support 12 will be confined substantially entirely to pivotal motion.

It is desirable in connection with the motion of the head relative to the arm that there be a small threshold of torque with viscous damping and a slight restoring force or "springiness." These effects become noticeable with clearances of the order of 0.002 inch and more pronounced as the clearances approach 0.010 inch.

The head 14 is provided with a fingerpiece 74 to facilitate lifting it from a record, and as depicted in FIG. 4, is provided with rails 76 for the reception of a suitably mounted cartridge. Also depicted in this portion of the head, there is a layer of fabric 78 having damping characteristics to avoid undesirable vibration in the vicinity of the cartridge itself.

Relative motion between the head and arm is limited by means of a pin 80 depicted in broken lines in FIG. 1, whose reduced end is received in an enlarged opening 82 in the wall of the head. Thus, the head can move upwardly or downwardly relative to the arm until the wall of the opening 82 engages the reduced end of the pin 80.

Above the opening 82, another opening 84 is provided for the passage of suitable conductors from the cartridge to an amplifier. The head also carries a pin 86 disposed above the pintle 60, the end of the pin receiving the eye of a helical spring 88 through which is threaded a damping element 90 which may be composed of felt or other suitable damping material, which may be impregnated with a damping liquid such as pitch or a silicone oil. The opposite end of the spring is received in an opening formed in the end of a slide element 92 received in a guide 94 secured to the underside of the upper surface of the arm 10, motion of the slide being confined to axial motion by means of a screw 96. Axial movement of the slide 92 is imparted by means of a screw 98 whose head 100 bears against a stop 102. The spring 88 is a relatively light one so that very delicate adjustment can be effected by rotation of the head 100 of the screw. In this way, the force applied to the record by the stylus can be adjusted very precisely to the desired value. Due to the angular relationship between the arm 10 and the head 14, the force of the spring 88 includes a component biasing the head towards the arm to take up any end play that might exist.

With reference to FIG. 1, the angle 104 defined by the intersection of the longitudinal axis of the arm and the longitudinal axis of the head is 22°, having been selected as the optimum value for phonograph disc records now in most common use. Similarly, the angle 106 defined by a line passing through the vertical axis of rotation and the stylus intersecting the longitudinal axis of the head has a value of 19½°.

Inasmuch as the "springy" effect desired in connection with movements of the head about a horizontal axis is not desirable at the vertical axis of movement of the arm about the support, the characteristics of the damped pivots at these two points will preferably be different. This may be achieved in a number of ways, among which is the selection of different damping liquids, the use of different clearances, and a combination of both. By virtue of the fact that the damping liquid in connection with each pivot is concentric with the pivotal axis, the behavior of the parts during relative motion will be uniform for all degrees of departure from a given reference point as distinguished from the non-uniform effects experienced with ball and socket joints and flat surfaces.

Whereas only one form of the invention has been shown and described, the invention should not be so restricted beyond the scope of the appended claims.

We claim:

1. A transducer assembly comprising a support, an arm and a head, a first pivot joint connecting said support and an intermediate portion of said arm for relative movement about a vertical axis, a second pivot joint connecting a terminal portion of said arm directly to a terminal portion of said head for relative movement about a horizontal axis, said second pivot joint including members mutually supported by spaced bearings and providing concentric surfaces of revolution mutually spaced throughout to define an annular gap, and a viscous damping liquid occupying said gap and imparting a restoring force to said head relative to said arm.

2. A transducer assembly as set forth in claim 1 wherein said surfaces of revolution are cylindrical.

3. A transducer assembly as set forth in claim 1 wherein said first pivot joint has an axis of rotation intersecting the center of gravity of the assembly.

4. A transducer assembly as set forth in claim 1 wherein said second pivot joint has an axis of rotation disposed at an angle exceeding 90° to the longitudinal axis of said arm.

5. A transducer assembly as set forth in claim 1 wherein said first pivot joint provides concentric surfaces of revolution spaced to define an annular gap, and a damping liquid occupies said gap.

6. A transducer assembly as set forth in claim 5 wherein said surfaces of revolution of said first pivot joint are cylindrical.

7. A transducer assembly comprising a support, an arm and a head, a first pivot joint connecting said support and arm for relative movement about a vertical axis, a second pivot joint connecting said arm directly to said head for relative movement about a horizontal axis, each of said pivot joints comprising members mutually supported by spaced bearings and providing concentric surfaces of revolution mutually spaced throughout and having viscous damping liquid interposed therebetween, said first and second pivot joints being dissimilarly damped.

8. A transducer assembly as set forth in claim 7 wherein one of said pivot joints contains an antifriction bearing.

9. A transducer assembly as set forth in claim 7 wherein each of said pivot joints contains an antifriction bearing.

10. A transducer assembly as set forth in claim 7 wherein one of said pivot joints comprises a socket member closed at one end and providing one of said surfaces, and a pintle member providing another of said surfaces.

11. A transducer assembly as set forth in claim 10 wherein said socket member houses a bearing and said pintle member has a reduced end received in said bearing.

12. A transducer assembly as set forth in claim 10 wherein said socket member houses spaced antifriction bearings and said pintle member has reduced portions received in said bearings.

13. A transducer assembly comprising a support, an arm and a head, a first pivot joint connecting said support to an intermediate portion of said arm for relative movement about a vertical axis, a second pivot joint directly connecting said head near one end of said arm for relative movement about a horizontal axis displaced from the center of gravity of said head, and a spring carried by said arm having ends connected to said head and arm and biasing said head in opposition to the force of gravity about said horizontal axis as a direct function of its tension.

14. A transducer assembly as set forth in claim 13 wherein said spring biases said head towards said arm along said horizontal axis.

15. A transducer assembly as set forth in claim 13 wherein adjusting means is provided for varying the force of said spring.

16. A transducer assembly as set forth in claim 13 wherein said spring is provided with damping means.

17. A transducer assembly as set forth in claim 16 wherein said pivot joints are provided with damping means.

18. A transducer assembly as set forth in claim 13 wherein said spring is helical.

19. A transducer assembly as set forth in claim 18 wherein a damping member extends through said spring for engagement with its convolutions.

References Cited in the file of this patent

UNITED STATES PATENTS

| | | |
|---|---|---|
| 1,742,085 | Kuchenmeister | Dec. 31, 1929 |
| 1,895,126 | Hilgenberg | Jan. 24, 1933 |
| 1,936,389 | Hallquist | Nov. 21, 1933 |
| 2,329,526 | Germeshausen | Sept. 14, 1943 |
| 2,369,087 | Thompson | Feb. 6, 1945 |
| 2,551,506 | Rockwell | May 1, 1951 |
| 2,587,529 | Rockwell | Feb. 26, 1952 |
| 2,676,806 | Bachman | Apr. 27, 1954 |

FOREIGN PATENTS

| | | |
|---|---|---|
| 417,927 | Great Britain | Oct. 8, 1934 |
| 618,814 | Great Britain | Feb. 28, 1949 |

UNITED STATES PATENT OFFICE
CERTIFICATE OF CORRECTION

Patent No. 3,003,772 October 10, 1961

Chester A. Snow, Jr., et al.

It is hereby certified that error appears in the above numbered patent requiring correction and that the said Letters Patent should read as corrected below.

Column 4, line 46, for "hearings" read -- bearings --.

Signed and sealed this 3rd day of April 1962.

(SEAL)
Attest:

ERNEST W. SWIDER
Attesting Officer

DAVID L. LADD
Commissioner of Patents